(12) United States Patent
Nakagawa et al.

(10) Patent No.: US 8,643,956 B2
(45) Date of Patent: Feb. 4, 2014

(54) LENS APPARATUS AND IMAGE PICKUP SYSTEM INCLUDING THE SAME

(75) Inventors: Hidenori Nakagawa, Utsunomiya (JP); Ryo Kuwano, Shioya-gun (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/334,212

(22) Filed: Dec. 22, 2011

(65) Prior Publication Data

US 2012/0162781 A1 Jun. 28, 2012

(30) Foreign Application Priority Data

Dec. 28, 2010 (JP) ................................. 2010-293710

(51) Int. Cl.
*G02B 15/14* (2006.01)
*G02B 7/02* (2006.01)

(52) U.S. Cl.
USPC ............ 359/697; 359/696; 359/822; 359/823

(58) Field of Classification Search
USPC .................................. 359/694–701, 822–826
See application file for complete search history.

(56) References Cited

U.S. PATENT DOCUMENTS

| 6,104,551 A | 8/2000 | Matsui | |
|---|---|---|---|
| 2004/0051971 A1* | 3/2004 | Nomura | ........................ 359/701 |
| 2011/0286110 A1* | 11/2011 | Ota | ............................ 359/694 |

FOREIGN PATENT DOCUMENTS

| JP | 11-109212 A | 4/1999 |
|---|---|---|
| JP | 11-326734 A | 11/1999 |
| WO | WO 2010052910 A1 * | 5/2010 |

* cited by examiner

*Primary Examiner* — Mahidere Sahle
(74) *Attorney, Agent, or Firm* — Rossi, Kimms & McDowell LLP

(57) ABSTRACT

A lens apparatus includes a fixed lens barrel, a cam ring provided inside the barrel, lens units, and a holder for holding the lens units movable in optical-axis direction, the holder including a driver for driving at least one of the lens units in the optical-axis direction, the holder supported movably in the optical-axis direction inside the cam ring, in which the holder includes cam followers, and the cam followers slidably engage with a cam groove of the cam ring and a straight groove of the barrel to determine a position of the holder in the optical-axis direction by rotation of the cam ring about optical axis, the holder includes a slide connector for electrically connecting to a contact provided slidably on the barrel through an opening penetrating the cam ring radially, and the driver is fed with power from the barrel side through the slide connector.

9 Claims, 12 Drawing Sheets

LENS APPARATUS AND IMAGE PICKUP SYSTEM INCLUDING THE SAME

BACKGROUND OF THE INVENTION

1. Field of the Invention

The present invention relates to a lens apparatus, in particular, a lens apparatus for operating a plurality of lens units by a cam ring, which is held by means including a driver capable of operating the lens units in an optical-axis direction within the cam ring, and an image pickup system including the same.

2. Description of the Related Art

A zoom lens system includes a zoom section generally including a magnification-varying lens unit and an aberration correction lens unit. The zoom lens system has a configuration in which the magnification-varying lens unit and the aberration correction lens unit are operated by a cam ring. The magnification-varying lens unit includes a multi-lens group corresponding to a plurality of lens units obtained by division. In particular, broadcast equipment is sometimes operated under conditions in which an operator performs a magnification-varying operation by a driver which is both electrically and manually operated. In each of the case where the driver is electrically operated and the case where the driver is manually operated, high operation followability is required. A structure suitable to satisfy the request of high operation followability is a cam mechanism. The operation followability can be ensured by directly connecting the cam mechanism to an operating unit. In order to operate the magnification-varying lens unit including the plurality of lens units obtained by the division, however, it is necessary to provide as many cam grooves as the number of divisions. For example, Japanese Patent Application Laid-Open No. H11-326734 discloses the following structure for operating a zoom lens system (paragraphs [0006] to [0008], FIGS. 4A and 4B, and the like). Specifically, the magnification-varying lens group is divided into two lens units. One cam groove for operating the thus obtained two magnification-varying lens units is provided to a cam member. The cam groove is configured so that a subject-side sliding surface and an image plane-side sliding surface of the cam groove forms driving loci necessary for varying the magnification of the respective magnification-varying lens units. The magnification-varying lens units are brought into abutment to the corresponding sliding surfaces, respectively. Japanese Patent Application Laid-Open No. H11-109212 discloses a structure in which a correction optical system driven in association with the magnification-varying lens unit is divided so as to enhance the followability of an associated operation with a focus optical system (paragraphs [0004] to [0007], FIGS. 1A and 1B, and the like).

In the related art disclosed in Japanese Patent Application Laid-Open No. H11-326734 and Japanese Patent Application Laid-Open No. H11-109212, the plurality of magnification-varying lens units obtained by the division is driven by the associated operation of a curved cam and a straight cam. In this structure, one cam groove is required for each optical unit as the number of optical units to be moved increases. Therefore, the structure for generating the curved cam is required to ensure a thickness in the optical-axis direction. As a result, a cam ring structure is disadvantageously increased in size. Moreover, for driving, the structure follows only the movement generated by the curved cam. Therefore, for example, in the case where zoom control for driving the magnification-varying lens units is performed so as to cancel an angle-of-field variation caused with the driving of the focus lens unit, controlled driving cannot be performed at a zoom end because an area where the cam groove is movable is not present at the zoom end. In the case of, for example, Japanese Patent Application Laid-Open No. H11-326734, the cam groove is divided into a forward part and a backward part to be respectively used for the magnification-varying lens units obtained by the division so as not to increase the number of cam grooves. Even with the efforts for preventing the number of cam grooves from being increased, a width of the cam groove itself is increased. Therefore, a total length of the cam ring is disadvantageously increased. Accordingly, even though a control operation for correcting the angle-of-field variation based on the focusing the driving control of the zoom unit is desired to be performed, the desired control cannot be performed at the zoom end.

A lens apparatus disclosed in Japanese Patent Application Laid-Open No. H11-109212 has a configuration in which the above-mentioned control can be performed even at the zoom end. When a driving unit is provided inside the optical system, however, a power source for feeding power to the driving unit or communication means for positional detection is exposed inside a lens barrel. Thus, it is presumable that harmful light reflection is caused or external appearance quality deteriorates thereby.

Moreover, in Japanese Patent Application Laid-Open NO. H11-109212, a structure of line connection for driving the driving unit is not described in detail. Therefore, a structure for driving the driving unit provided inside the optical system without affecting optical performance is not described.

SUMMARY OF THE INVENTION

In view of the above-mentioned problems, an object of the present invention is to provide a lens apparatus in which a position of a lens group including a plurality of lens units in an optical-axis direction is defined by a cam ring mechanism, which includes a driving mechanism capable of changing a distance between the lens units, without wiring an electric line inside an optical system, which may cause the deterioration of optical performance due to harmful light reflection or the like. Further, when power feeding lines provided inside and outside a cam ring are connected by a cable line or the like, a driving load is required due to the wiring of the cable line when moving the lens units inside the cam ring in the optical-axis direction by the cam ring mechanism, which may be a factor of inhibiting an accurate driving of the lens units. Therefore, the present invention also provides a configuration for realizing, by avoiding the cable line, an electrical connection from which the factor of inhibiting the accurate operation of the lens units is eliminated. Another object of the present invention is to provide a zoom lens system including a driving mechanism inside the cam ring, which is capable of performing control of both operation of a magnification-varying lens unit for varying a magnification and operation of the magnification-varying lens unit for correcting an angle-of-field variation over the entire zoom range without adversely affecting the optical performance.

In order to achieve the above-mentioned objects, according to an aspect of the present invention, there is provided a lens apparatus, including: a fixed lens barrel; a cam ring provided inside the fixed lens barrel; a plurality of lens units; and first holding unit for holding the plurality of lens units movable in an optical-axis direction, the first holding unit including a driver for driving at least one of the plurality of lens units in the optical-axis direction, the first holding unit being supported movably in the optical-axis direction inside the cam ring, in which: the first holding unit includes a plurality of cam followers, and the plurality of cam followers are slidably engaged a cam groove of the cam ring and a straight groove of the fixed lens barrel to determine a position of the first holding unit in the optical-axis direction by rotation of the cam ring about an optical axis; the first holding unit includes a slide connecting portion for electrically connecting to a contact provided on the fixed lens barrel in a slidable manner through an intermediation of an opening penetrating the cam ring in a radial direction; and the driver is fed with power from the fixed lens barrel side through an intermediation of the slide connecting portion.

Further, according to another aspect of the present invention, there is provided a lens apparatus, including: a fixed lens barrel; a cam ring provided inside the fixed lens barrel; a focus lens unit; a zoom lens unit including a plurality of magnification-varying lens units and an aberration correction lens unit; first holding unit for holding the plurality of magnification-varying lens units movable in an optical-axis direction, the first holding unit including a driver for driving the plurality of magnification-varying lens units in the optical-axis direction, the first holding unit being supported movably in the optical-axis direction inside the cam ring; and second holding unit for holding the aberration correction lens unit so as to be driven in the optical-axis direction, the second holding unit being supported movably in the optical-axis direction inside the cam ring, in which: each of the first holding unit and the second holding unit includes a plurality of cam followers, and the plurality of cam followers are slidably engaged with corresponding cam grooves of the cam ring and a straight groove of the fixed lens barrel to determine a position of the each of the first holding unit and the second holding unit in the optical-axis direction by rotation of the cam ring about an optical axis; the first holding unit includes a slide connecting portion for electrically connecting to a contact provided on the fixed lens barrel in a slidable manner through an intermediation of an opening penetrating the cam ring in a radial direction; and the driver is fed with power from the fixed lens barrel side through an intermediation of the slide connecting portion.

According to the present invention, the lens apparatus in which the position of the lens group including the plurality of lens units in the optical-axis direction is defined by the cam ring mechanism, which includes the driving mechanism capable of changing the distance between the lens units, without the projection of the electric line into an internal space of the optical system, which may cause the deterioration of the optical performance due to the harmful light reflection or the like, and can minimize a load on the accurate operation of the lens units, can be provided. By providing the above-mentioned configuration, the zoom lens apparatus including the driving mechanism provided inside the cam ring, in which the optical units of the zoom unit can perform both the driving for varying the magnification and the driving for control for correcting the angle-of-field variation over the entire zoom range without adversely affecting the optical performance, can be provided.

Further features of the present invention will become apparent from the following description of exemplary embodiments with reference to the attached drawings.

DESCRIPTION OF THE EMBODIMENTS

Hereinafter, exemplary embodiments of the present invention are described in detail with reference to the attached drawings.

First Embodiment

Hereinafter, a lens apparatus including a driving mechanism provided inside a cam ring according to a first embodiment of the present invention is described referring to FIGS. 1A to 4B.

Figure 1A:
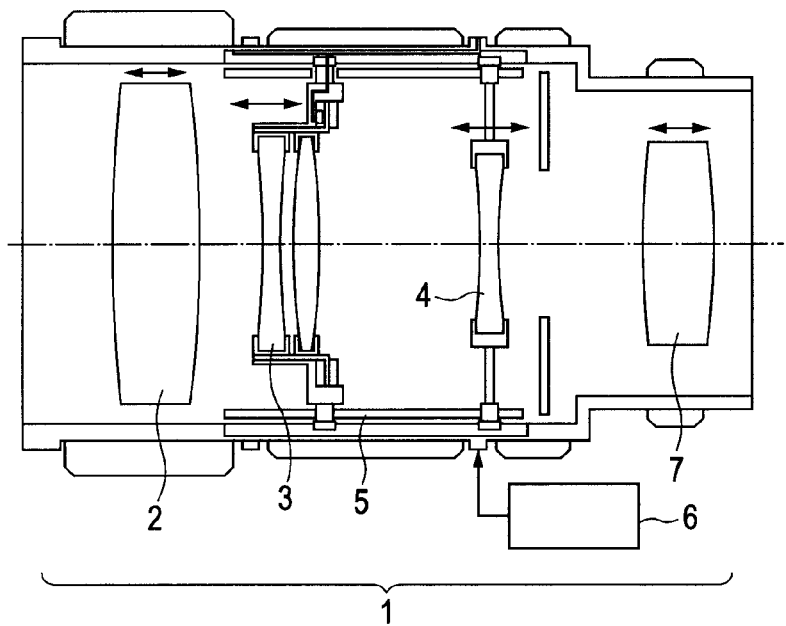
FIG. 1A is a schematic diagram illustrating an entire zoom lens system according to a first embodiment of the present invention.

FIG. 1A is an explanatory view illustrating a configuration of the lens apparatus including the driving mechanism provided inside the cam ring according to the present invention. A zoom lens system 1 includes a focus lens unit 2, a magnification-varying lens unit 3 and an aberration correction lens unit 4 constituting a zoom lens unit, a cam ring 5 having a cam structure for driving the magnification-varying lens unit 3 and the aberration correction lens unit 4, a control section 6, and an imaging lens unit 7.

Figure 1B:
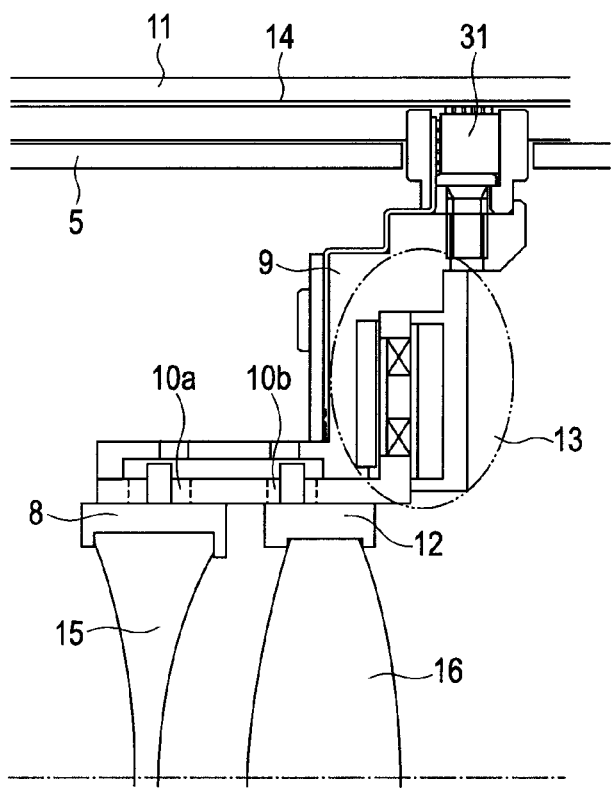
FIG. 1B is a configuration diagram illustrating a principal part of FIG. 1A.

FIG. 1B is an enlarged view of a principal part of the zoom lens system of this embodiment. In a main casing 11, the cam ring 5 is provided. The magnification-varying lens unit 3 includes a first magnification-varying lens unit 15 held by a first magnification-varying lens unit holder 8 and a second magnification-varying lens unit 16 held by a second magnification-varying lens unit holder 12. The first magnification-varying lens unit holder 8 and the second magnification-varying lens unit holder 12 are supported by a moving lens barrel (first holding unit) 9 so as to be movable in an optical-axis direction through an intermediation of cam portions 10a and 10b of a driving mechanism section 13. The driving mechanism section 13 is supported by the moving lens barrel 9 so as to be pivotable about the optical axis. In this manner, the driving mechanism section 13 drives the first magnification-varying lens unit holder 8 (first magnification-varying lens unit 15) and the second magnification-varying lens unit holder 12 (second magnification-varying lens unit 16) in association in the optical-axis direction through an intermediation of the cam portions 10a and 10b for converting a rotational displacement of the driving mechanism section 13 about the optical axis into a displacement in the optical-axis direction. The moving lens barrel 9 includes a contact adapter 31 which is held slidably in contact with a conductor line 14 in a straight groove provided on the main casing (fixed lens barrel) 11 through an intermediation of an opening penetrating the cam ring 5 in a radial direction. The driving mechanism section 13 receives power fed from the main casing 11 side through an intermediation of the contact adapter 31 and can transmit and receive a driving control signal.

Next, a specific structure of the driving mechanism section 13 and a structure for energization are described referring to FIGS. 2A to 5.

Figure 2A:
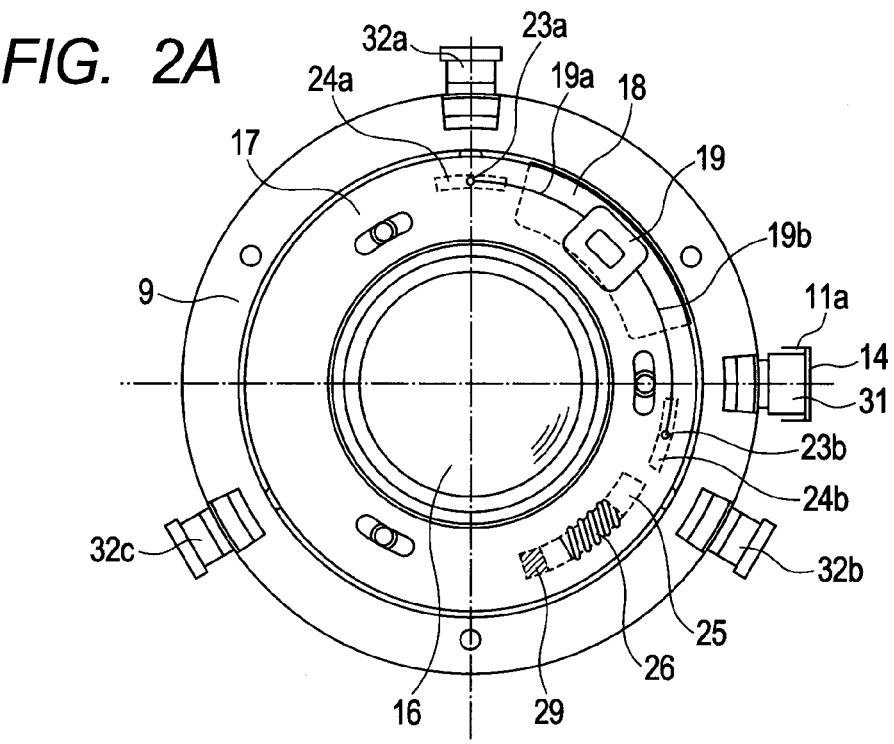
FIG. 2A is an explanatory view illustrating lines to a driving mechanism section in the first embodiment.
Figure 2B:
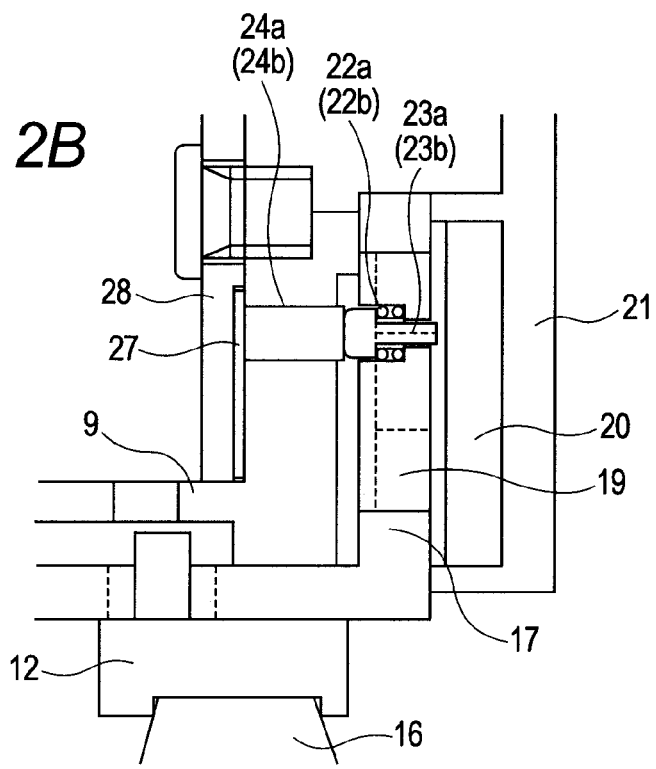
FIG. 2B is an explanatory view illustrating contacts.

FIG. 2A is a view of the magnification-varying lens unit 3 as viewed from the side where an image pickup element is provided, and FIG. 2B is an enlarged view of a principal part of the driving mechanism section 13. As illustrated in FIGS. 2A and 2B, a first yoke 18 (indicated by a dot line in FIG. 2A) is provided at a position of the moving lens barrel 9 so as to be opposed to a driving ring 17. In addition, a driving coil 19, a magnet 20, and a second yoke 21 are provided to the driving ring 17 to constitute a known voice coil motor. Lines 19a and 19b for power feeding are wound around from the driving coil 19. A contact 23a is connected to the line 19a through an intermediation of an elastic member 22a having a predetermined elastic force, whereas a contact 23b is connected to the line 19b through an intermediation of an elastic member 22b having a predetermined elastic force. The contact 23a is slidably abutted against a contact 24a (indicated by a dot line in FIG. 2A) provided to the moving lens barrel 9, whereas the contact 23b is slidably abutted against a contact 24b (indicated by a dot line in FIG. 2A) provided to the moving lens barrel 9. A scale 25 (indicated by a dot line in FIG. 2A) for detecting a displacement is provided to the driving ring 17. A position detecting sensor 26 is provided at a position of the moving lens barrel 9 so as to be opposed to the scale 25 at a predetermined distance therefrom. Based on the results of detection by the position detecting sensor 26, the positions of the first magnification-varying lens unit 15 and the second magnification-varying lens unit 16 with respect to the moving lens barrel 9 can be specified.

Figure 2C:
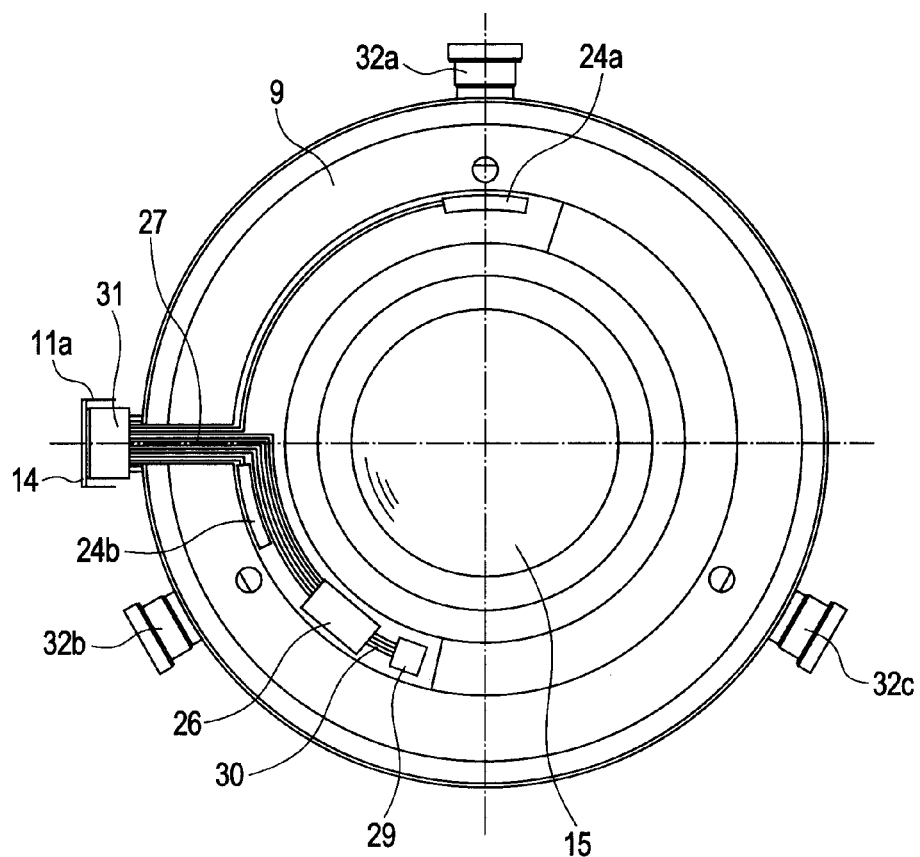
FIG. 2C is an explanatory view illustrating a state in which a power feeding line is provide on an moving lens barrel as viewed from a subject side.

FIG. 2C is a view of the magnification-varying lens unit 3 as viewed from a subject side. A power feeding line 27 for feeding power to the contacts 24a and 24b and the position detecting sensor 26 is provided on the moving lens barrel 9. The power feeding line 27 is prevented from being exposed inside an optical system by a cover 28 (see FIG. 2B). A detection-unit line 30 to a transmitter 29, for wireless transmission of a detection signal from the position detecting sensor 26 to a detection section included in the control section 6 performing lens control (not shown) is also provided.

The moving lens barrel 9 includes a plurality of posture positioners (cam followers) 32a to 32c for determining a position of the moving lens barrel 9 in the optical-axis direction based on the rotation of the cam ring 5 about the optical axis, which are slidably brought into engagement with a cam groove of the cam ring 5. Further, the moving lens barrel 9 includes the contact adapter (slide connecting portion) 31 at a position in a phase different (in a rotating direction about the optical axis) from that of the posture positioners (cam followers) 32a to 32c. The power feeding line 27 is connected to the contact adapter 31 and is connected to a power feeding line from the exterior (fixed lens barrel side) of the magnification-varying lens unit 3 through an intermediation of the contact adapter 31. The contact adapter 31 abuts against the conductor line portion 14 provided in a straight groove 11a provided on the main casing 11 through a dedicated runout grove 33 provided on the cam ring 5 for driving the magnification-varying lens unit 3 and the aberration correction lens unit 4, thereby feeding power from the main casing 11 to the magnification-varying lens unit 3.

Figure 3:
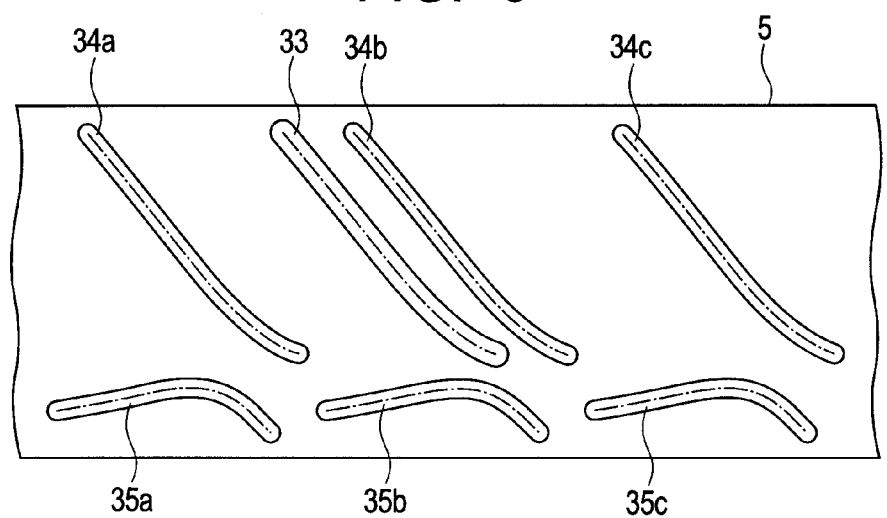
FIG. 3 is an explanatory view illustrating a relation between cam loci and a contact coma runout groove in the first embodiment.

FIG. 3 is an exploded view of the cam ring 5. An upper side of FIG. 3 corresponds to an object side, whereas a lower side thereof corresponds to an image pickup plane side. As illustrated in FIG. 3, the dedicated runout groove 33 is provided in a phase which does not interfere with both cam grooves (first cam grooves) 34a to 34c with which the posture positioners 32a to 32c of the magnification-varying lens unit 3 come into engagement and cam grooves (second cam grooves) 35a to 35c with which the cam followers of an aberration correction lens unit holder (second holding unit) for holding the aberration correction lens unit 4 come into engagement.

Figure 4A:
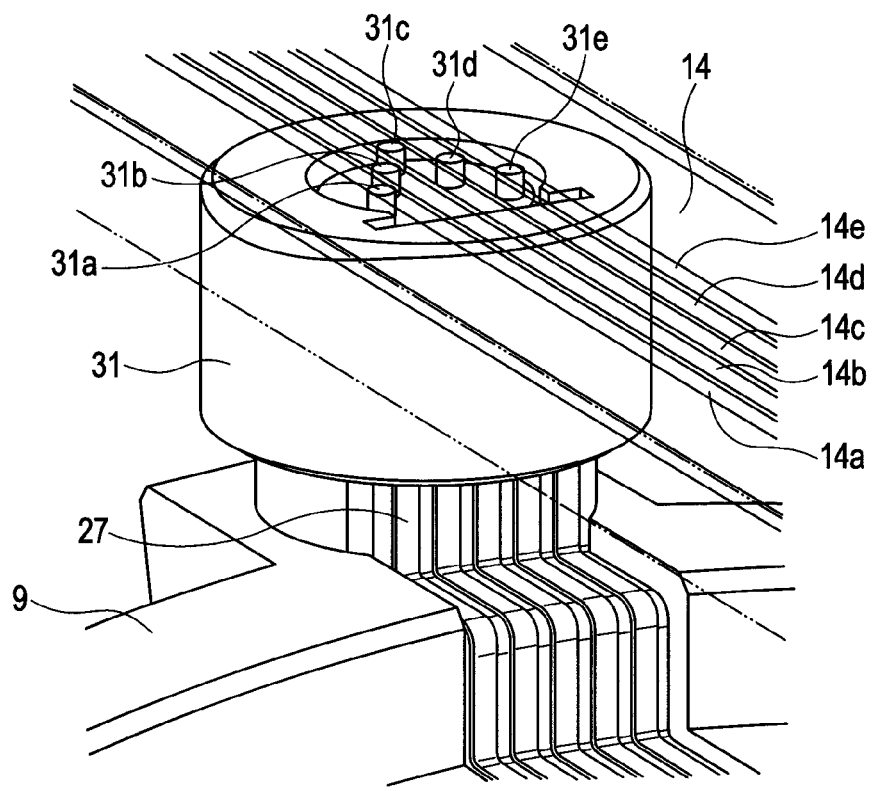
FIG. 4A is an explanatory view illustrating a state in which a contact adapter and a conductor line portion abut against each other in the first embodiment.
Figure 4B:
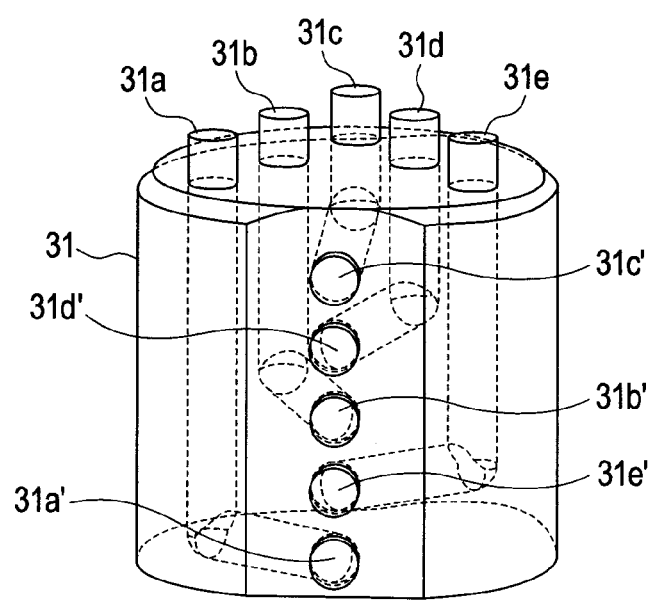
FIG. 4B is an explanatory view illustrating a structure of the contact adapter in the first embodiment.

FIG. 4A illustrates a state in which the contact adapter 31 and the conductor line portion 14 provided in the straight groove 11a provided on the main casing 11 are held in abutment against each other. Contacts 31a to 31e provided on the contact adapter 31 are respectively slidably abutted against contact lines 14a to 14e provided on the conductor line portion 14. FIG. 4B illustrates a structure of wiring about the contacts 31a to 31e inside the contact adapter 31. The contacts 31a to 31e of the contact adapter 31 are wired to be arranged in a vertical column as indicated by 31a' to 31e' without interfering with each other inside the contact adapter 31. By the abutment (not shown) against the power feeding line 27 of the moving lens barrel 9, power supplied from the exterior is fed to the driving mechanism section 13 so as to enable the displacements of the first magnification-varying lens unit holder 8 and the second magnification-varying lens unit holder 12. In this embodiment, the contacts 31a to 31e of the contact adapter 31 and the power feeding line 27 of the moving lens barrel 9 are connected to each other by the abutment of the contacts 31a' and 31'e. However, the present invention is not limited thereto, and the connection may be achieved by other connection methods for electrical connection.

According to this first embodiment described above, in the configuration in which the members and structure for power feeding are realized without being exposed inside the optical system or protruding into an internal space of the optical system and the movable unit (driven unit) is further provided inside the movable optical system, power can be fed without adversely affecting optical performance by the reflection of harmful light or lowering external appearance quality.

Next, a control method for driving the first magnification-varying lens unit 15 (first magnification-varying lens unit holder 8) and the second magnification-varying lens unit 16

Figure 5:
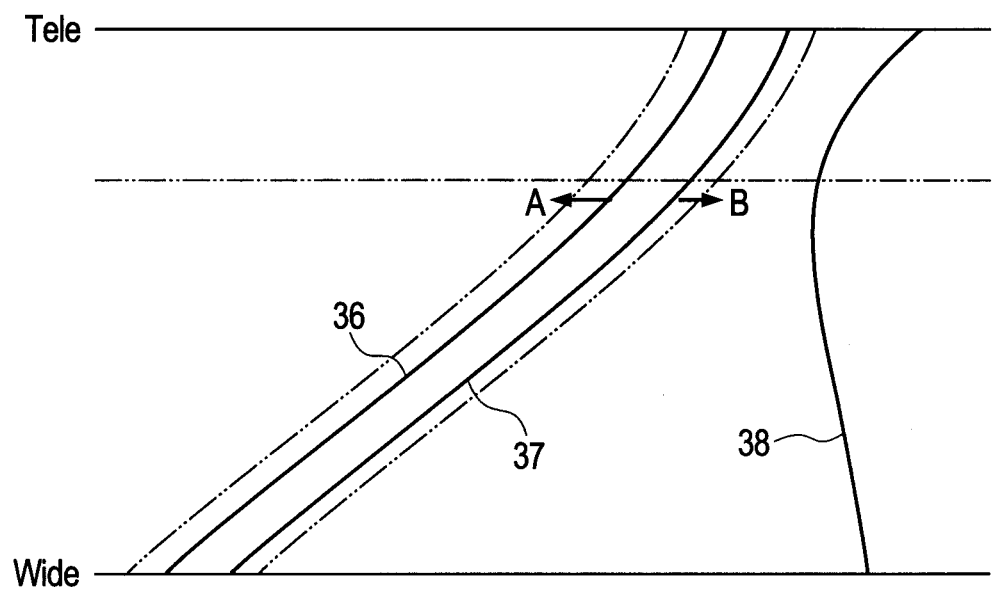
FIG. 5 is an explanatory view illustrating a driving method when angle-of-field correction control is performed by a magnification-varying lens unit in the first embodiment.
Figure 6:
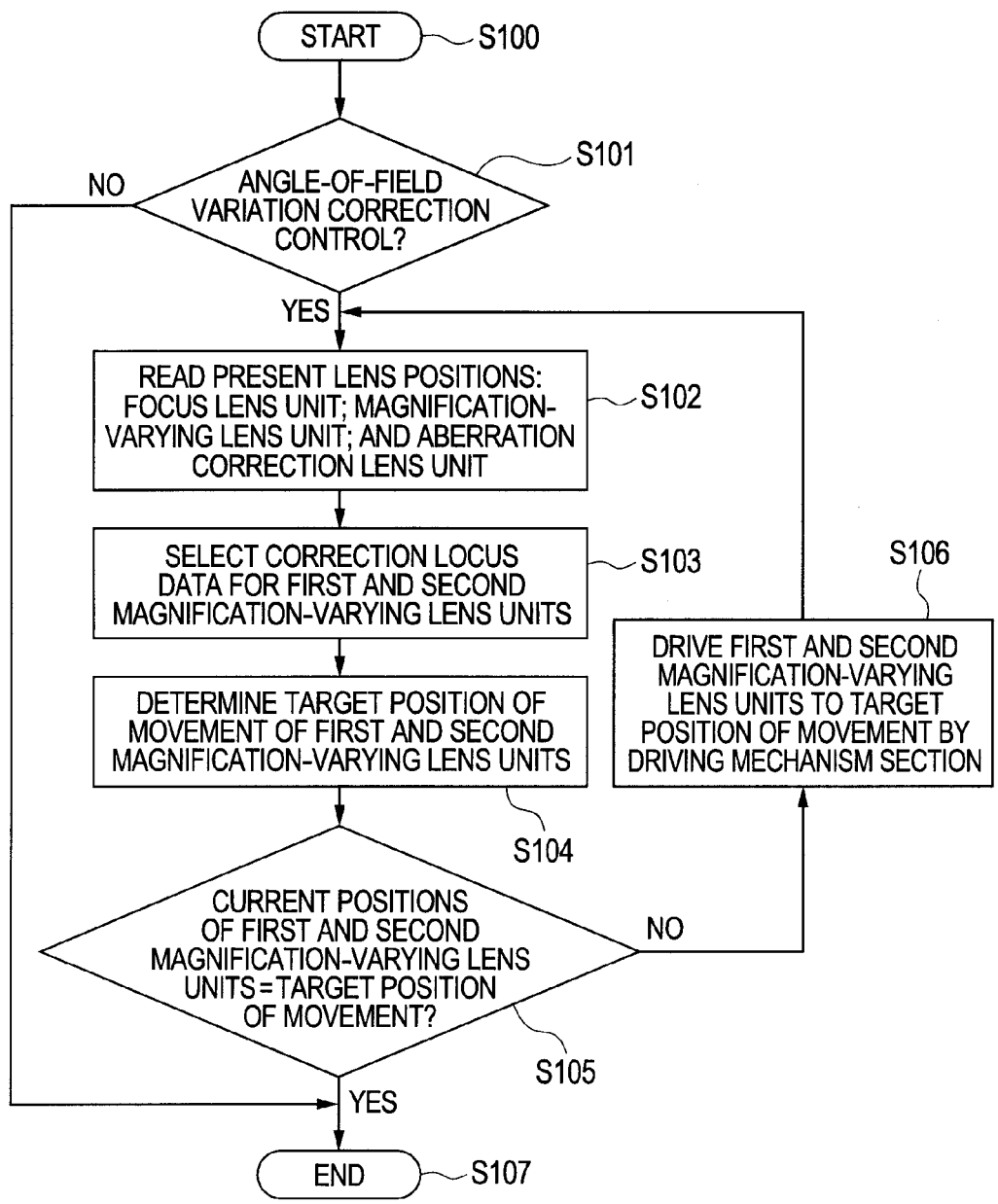
FIG. 6 is a flowchart illustrating a control flow in the first embodiment.

(second magnification-varying lens unit holder 12) is described in detail referring to FIGS. 5 and 6.

FIG. 5 illustrates a driving locus 36 of the first magnification-varying lens unit 15 (first magnification-varying lens unit holder 8), a driving locus 37 of the second magnification-varying lens unit 16 (second magnification-varying lens unit holder 12), and a driving locus 38 of the aberration correction lens unit 4 (aberration correction lens unit holder) when a zoom operation of the zoom lens system 1 is performed from a wide angle end to a telephoto end. As indicated by the solid lines 36 and 37 illustrated in FIG. 5, during a normal zoom operation, the first magnification-varying lens unit 15 and the second magnification-varying lens unit 16 trace the driving loci for demonstrating desirable optical performance while keeping a constant distance therebetween. When the focus lens unit 2 is driven for focusing so that an in-focus state is maintained for a predetermined subject at an arbitrary zoom position during a zoom operation of the first magnification-varying lens unit 15 and the second magnification-varying lens unit 16 along the loci indicated by the solid lines 36 and 37 illustrated in FIG. 5, an photographing angle of field is varied. Therefore, the first magnification-varying lens unit 15 is driven to the subject side (in a direction indicated by the arrow A in FIG. 5) with respect to the solid line 36 illustrated in FIG. 5, whereas the second magnification-varying lens unit 16 is driven to an image plane side (in a direction indicated by the arrow B in FIG. 5) with respect to the solid line 37 illustrated in FIG. 5. By changing the distance between the first magnification-varying lens unit 15 and the second magnification-varying lens unit 16 (indicated by two-dot chain lines in FIG. 5) in this manner, the in-focus state can be maintained while an angle-of-field variation caused with the movement of the focus lens unit is cancelled. The first magnification-varying lens unit 15 and the second magnification-varying lens unit 16 can be driven in the optical-axis direction by the driving mechanism section 13 (cam portions 10a and 10b) in association within the range between the solid line 36 and the two-dot chain line corresponding thereto in FIG. 5 and within the range between the solid line 37 and the two-dot chain line corresponding thereto at the arbitrary zoom position, respectively. By the above-mentioned operation, the angle-of-field variation can be corrected.

FIG. 6 is a flowchart of a control flow of the first magnification-varying lens unit 15 and the second magnification-varying lens unit 16 when the angle-of-field variation due to the focusing is corrected by using the first magnification-varying lens unit 15 and the second magnification-varying lens unit 16. Immediately after the zoom lens unit is driven to a desired zoom position by the rotation of the cam ring caused by the zoom operation, the control flow illustrated in FIG. 6 is executed.

In Step S100, angle-of-field variation correcting processing is started. The processing proceeds to Step S101 where a state of setting of control (angle-of-field variation correcting control) for correcting the angle-of-field variation due to focusing is determined. When the state of setting is a state that the angle-of-field variation correcting control it to be performed, the processing proceeds to Step S102. When the state of setting is a state that the angle-of-field variation correcting control is not to be performed, the processing proceeds to Step S107 where the processing ends.

In Step S102, positional information of each of the focus lens unit 2, the magnification-varying lens unit 3, and the aberration correcting lens unit 4 at the current time is read, and then the processing proceeds to Step S103. In Step S103, based on the position data of the lens units read in Step S102, correction driving locus data of the first magnification-varying lens unit 15 and the second magnification-varying lens unit 16, for driving the driving mechanism section 13, is selected.

In Step S104, based on the correction driving locus data, which is selected in Step S103, target positions of movement of the first magnification-varying lens unit 15 and the second magnification-varying lens unit 16 are determined.

In Step S105, it is determined whether the current positions of the first magnification-varying lens unit 15 and the second magnification-varying lens unit 16 are the target positions of movement. When the current positions of the first magnification-varying lens unit 15 and the second magnification-varying lens unit 16 are identical with the target positions of movement or each of differences therebetween is within a predetermined range, the processing proceeds to Step S107 where the processing ends. When it is determined in Step S105 that the current positions of the first magnification-varying lens unit 15 and the second magnification-varying lens unit 16 are not identical with the target positions of movement or one or both of the differences are larger than the predetermined range, the driving mechanism section 13 is driven to operate the first magnification-varying lens unit 15 and the second magnification-varying lens unit 16 to the target positions of movement. Then, the processing returns to Step S102.

Focusing control can be executed independently of the angle-of-field variation correcting control illustrated in FIG. 6. During a magnification-varying operation (during the driving operation of the magnification-varying lens unit 3) by driving the cam ring, which is executed prior to the processing illustrated in FIG. 6 or during the angle-of-field variation correcting control illustrated in FIG. 6, a focusing operation for maintaining the in-focus state for a predetermined subject can be automatically or manually performed. Therefore, when the first magnification-varying lens unit 15 and the second magnification-varying lens unit 16 are driven in Step S106, the position of the focus lens unit 2 is changed automatically or manually. As a result, there is a possibility that the correction locus data selected in Step S103 and the target positions of movement determined in Step S104 sequentially change. Specifically, until the angle-of-field variation due to the focusing processing performed in parallel to the processing illustrated in FIG. 6 is cancelled by the processing illustrated in FIG. 6, the first magnification-varying lens unit 15 and the second magnification-varying lens unit 16 alone are driven without driving the aberration correction lens unit 4 by repeating the processing of Steps S102 to S106. As a result, the angle-of-field variation caused by the driving of the focus lens unit 2 is cancelled out. Thus, a desired angle of field can be always obtained.

In this embodiment, the case where the voice coil motor is used as the driving mechanism section 13 has been described. However, the same effects can be obtained even when an actuator for generating a displacement by power feeding is used instead.

As described above, according to the structure of this first embodiment in which the magnification-varying lens unit can be driven independently of the aberration correction lens unit, it is possible to provide the structure in which the lines for feeding power to the members inside the optical system of the zoom lens system are not exposed in the optical system so as to prevent quality from deteriorating due to the harmful reflection light or the exposure of internal appearance caused by the lines. By the control of this embodiment, the angle-of-field correction at the zoom end position, which cannot be conventionally realized by the angle-of-field correction control only with the driving of the cam ring, can be realized without impairing the optical performance. As a result, highly versatile control, which allows the angle-of-field variation correction to be performed over the entire zoom range, is provided.

Further, in this embodiment, the structure relating to the optical system of the magnification-varying lens unit has been described in detail. In terms of the structure, the same structure can be available even when the driving mechanism is provided to the aberration correction lens unit. Therefore, the present invention is applicable to the optical system of the aberration correction lens unit. According to the present invention, even with the structure including the driving structure inside the cam ring and power is fed from the exterior of the cam ring to the driving structure, a photographer can photograph an image in which, without impairing the optical performance, the angle-of-field variation caused by focusing is satisfactorily corrected over the entire zoom range.

In this embodiment, the detection signal from the position detecting sensor 26 is described as being wirelessly transmitted to the detector included in the computing unit performing the lens control (not shown) from the transmission section 29. However, the present invention is not limited thereto. The detection signal from the position detecting sensor 26 may be transmitted through communication with the computing unit provided outside of the cam ring by the line through an intermediation of the contact adapter.

Second Embodiment

Hereinafter, a zoom lens system including the driving device inside the cam ring of the zoom lens system according to a second embodiment of the present invention is described referring to FIGS. 7 to 10. The contents of the same configuration as those of the first embodiment are denoted by the same reference numerals in the following description. A basic schematic configuration of the zoom lens system 1 of this second embodiment is the same as that of the first embodiment illustrated in FIG. 1A.

Figure 7:
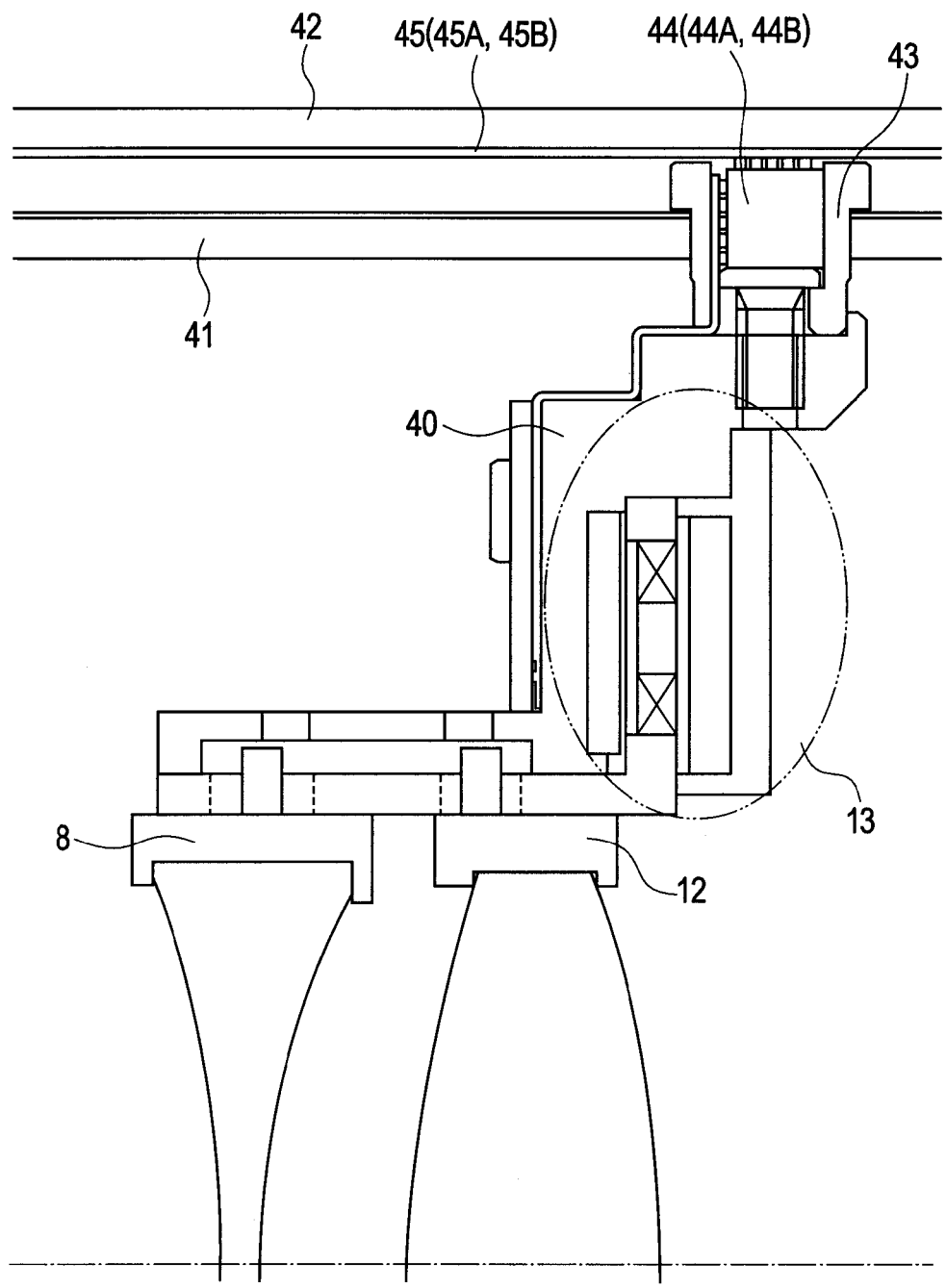
FIG. 7 is a configuration diagram illustrating a principal part of a zoom lens system according to a second embodiment of the present invention.

FIG. 7 is an enlarged view of a principal part of the zoom lens system 1 according to this second embodiment. The zoom lens system 1 has the same configuration as that of the first embodiment. However, the zoom lens system 1 of the second embodiment differs from that of the first embodiment in that a communication contact member 44 configured integrally with a positioner 43 is provided in place of the contact adapter 31 for connecting a moving lens barrel 40 inside the cam ring and the power feeding line on a main casing 42 side to each other. Even in this second embodiment, the moving lens barrel 40 includes a plurality of posture positioners (cam followers) 43 which slidably come into engagement with a cam groove of a cam ring 41 to determine the position of the moving lens barrel 40 in the optical-axis direction according to the rotation of the cam ring 41 about the optical axis. The posture positioners 43 slidably come into engagement with straight grooves provided on the main casing 42. The communication contact member 44 is provided inside the positioner 43, and is slidably abutted against line portions 45 provided in the straight grooves provided at a plurality of positions of the main casing 42. A configuration of the driving mechanism section 13 is the same as that described in the first embodiment, and therefore the detailed description thereof is herein omitted.

Figure 8:
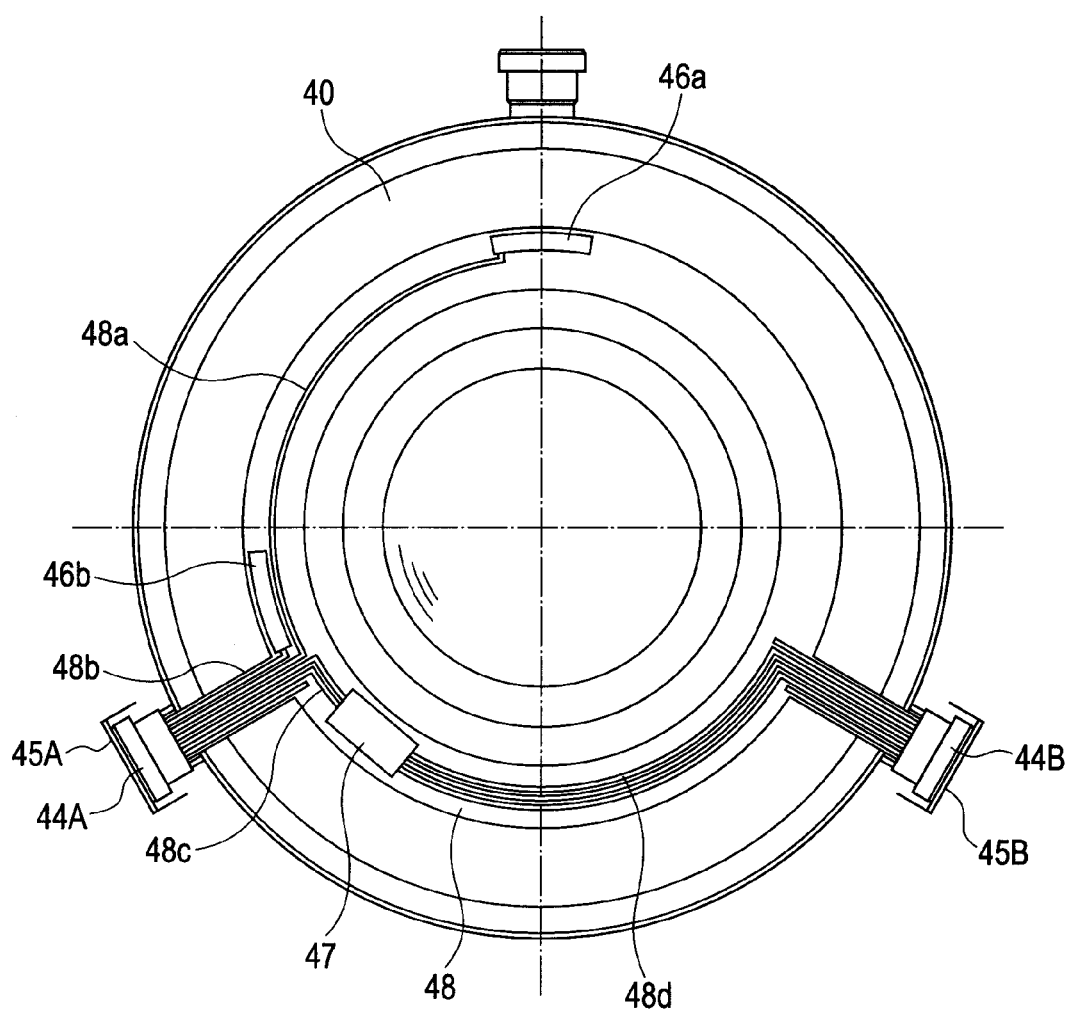
FIG. 8 is an explanatory view illustrating a state in which a power feeding line is provided on a moving lens barrel in the second embodiment.

FIG. 8 is a view illustrating the magnification-varying lens unit 3 as viewed from the subject side. In the zoom lens system of this second embodiment, power feeding contacts 46a and 46b for feeding power to the driving coil 19 provided inside the driving mechanism section 13 are provided to the moving lens barrel 40. The lines 19a and 19b extending from the driving coil 19 are connected to the contacts 23a and 23b through the elastic members 22a and 22b, each having the predetermined elastic force, and are held in abutment against the power feeding contacts 46a and 46b, respectively. A line connection member 48 is provided to the moving lens barrel 40. The line connection member 48 includes lines for feeding power from the communication contact member 44 to the power feeding contacts 46a and 46b and the position detecting sensor 47 for detecting the displacement of the second magnification-varying lens unit 12 and for communication of an output signal from the position detecting sensor 47.

The line connection member 48 includes power feeding lines 48a and 48b respectively connected to the power feeding contacts 46a and 46b, a power feeding line 48c connected to the position detecting sensor 47, and a communication line 48d of the output signal of the position detecting sensor 47. The above-mentioned lines are connected in a distributed manner to the communication contact members 44A and 44B.

Each of the communication contact members 44A and 44B is configured in the same manner as that of the contact adapter 31 described in detail in the first embodiment, and is mounted inside the positioner 43.

Figure 9:
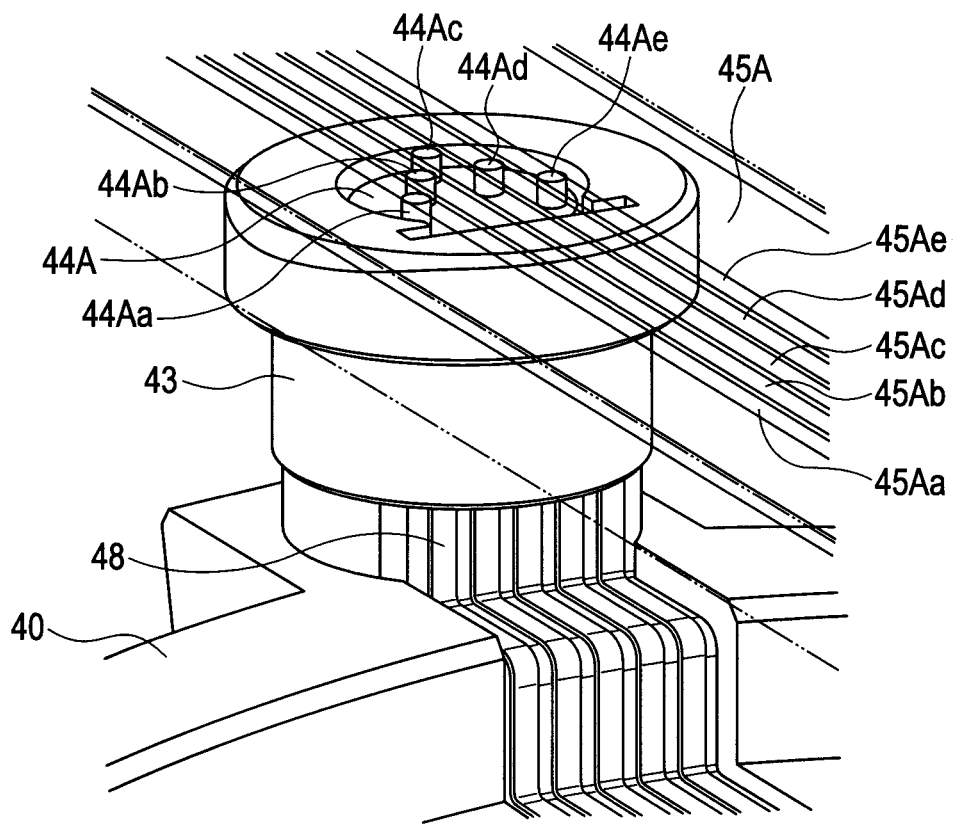
FIG. 9 is an explanatory view illustrating a configuration of a contact in the second embodiment.

As illustrated in FIG. 9, the communication contact member 44A and the line portion 45A abut against each other at conducting lines 44Aa to 44Ae and 45Aa to 45Ae which are independent of each other. Through each of the conducting lines, power feeding and communication of specific information (communication of a control signal and a detection signal) can be performed. The communication contact member 44B (conducting lines 44Ba to 44Be) and the line portion 45B (conducting lines 45Ba to 45Be) have the same configurations as those of the communication contact member 44A (conducting lines 44Aa to 44Ae) and the line portion 45A (conducting lines 45Aa to 45Ae) illustrated in FIG. 9.

According to the configuration of this second embodiment, it is not necessary to provide a dedicated groove (opening penetrating in the radial direction) through the cam ring 41 as a configuration for ensuring the electric contacts for power feeding and communication. Therefore, a configuration enabling the communication by simply providing the cam mechanism including the cam grooves and the cam followers indispensable to the magnification-varying lens unit 3 and the aberration correction lens unit 4, which move inside the lens apparatus, as in the conventional configuration, can be provided.

Figure 10:
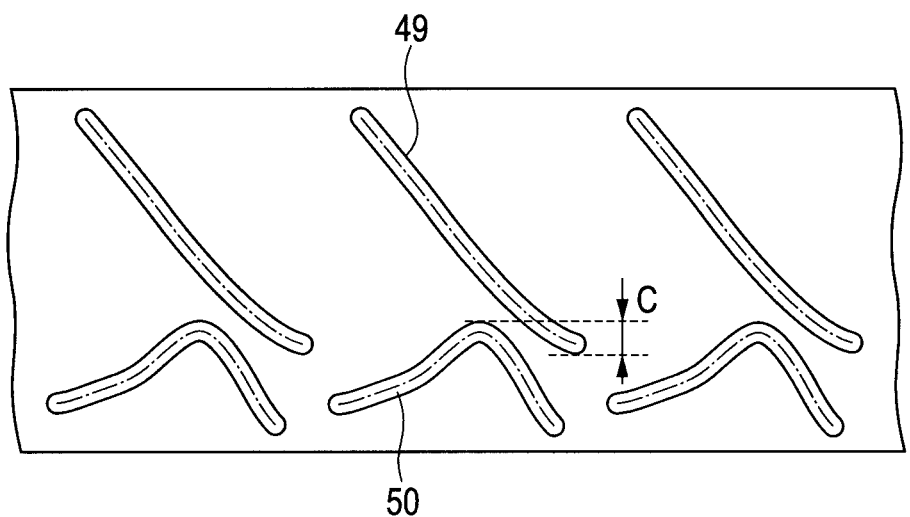
FIG. 10 is an explanatory view illustrating a relation between cam loci and a contact coma runout groove in the second embodiment.

As illustrated in FIG. 10, in the case of a zoom lens system with a high zoom factor, in particular, an area where a cam groove 49 of the magnification-varying lens unit 3 is formed in the optical-axis direction and an area where a cam groove 50 of the aberration correction lens unit 4 is formed in the optical-axis direction are contained in the same range C illustrated in FIG. 10. With the configuration of the present invention, however, the power feeding lines or the signal lines do not project into the limited space inside the optical system. As a result, a line structure which does not adversely affect the optical performance can be realized.

Even according to this second embodiment, similarly to the first embodiment described in detail with reference to FIGS. 5 and 6, it is possible to obtain the effects of enabling the photographer to take an image obtained after the angle-of-field variation caused by focusing is corrected without affecting the optical performance with the harmful light reflection caused by the line structure.

Third Embodiment

Hereinafter, a lens apparatus including the driving device inside the cam ring according to a third embodiment of the present invention is described referring to FIG. 11. The contents of the same configuration as those of the first and the second embodiments are denoted by the same reference numerals in the following description. A basic schematic configuration of the zoom lens system 1 of this third embodiment is the same as that of the second embodiment illustrated in FIG. 7.

Figure 11:
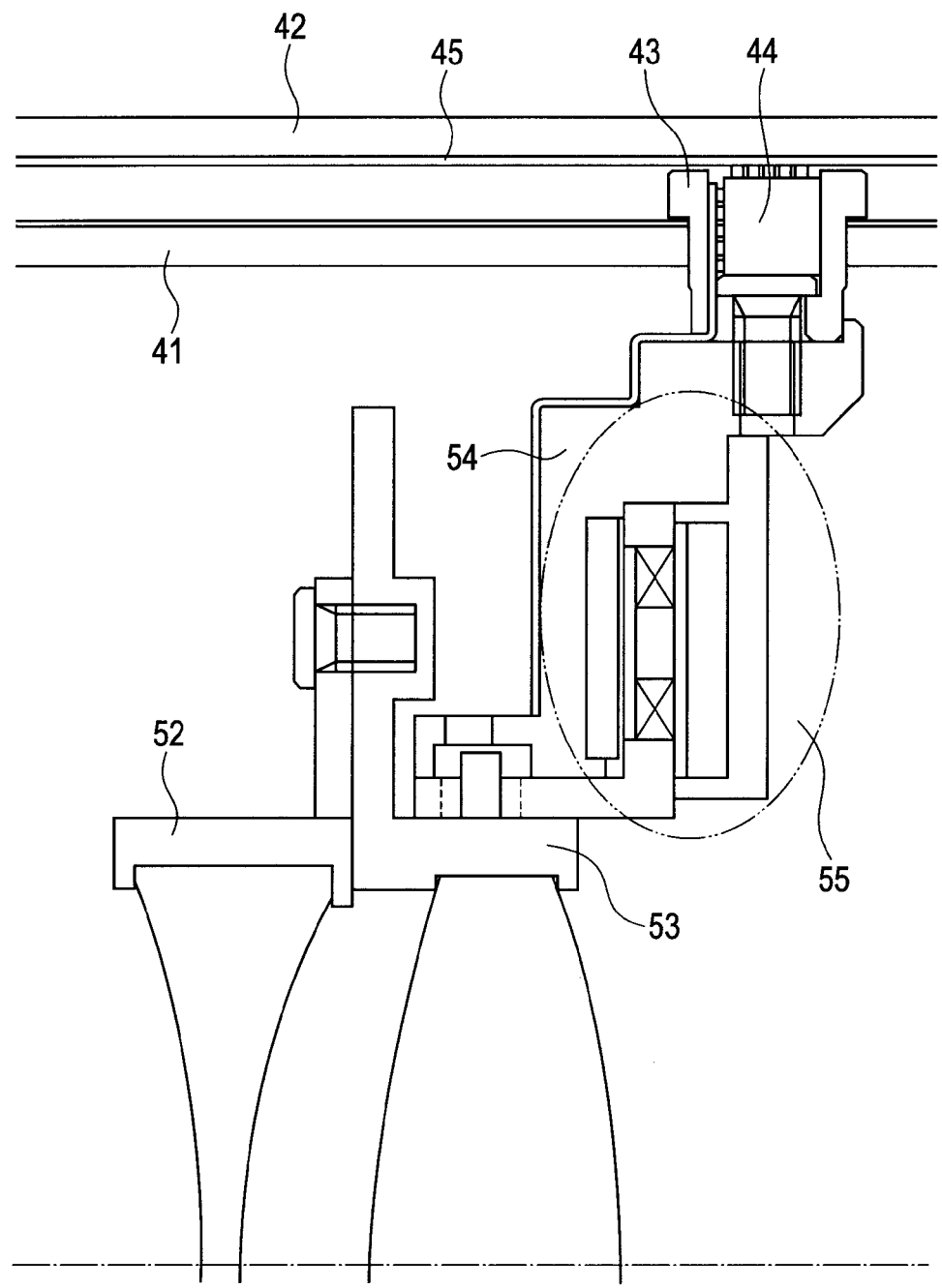
FIG. 11 is a configuration diagram illustrating a principal part of a zoom lens system according to a third embodiment of the present invention.

FIG. 11 is an enlarged view of a principal part of the zoom lens system 1 according to this third embodiment. The magnification-varying lens unit 3 of the third embodiment includes the first magnification-varying lens unit 15 held by a first magnification-varying lens unit holder 52 and the second magnification-varying lens unit 16 held by a second magnification-varying lens unit holder 53. The third embodiment differs from the second embodiment in that the first magnification-varying lens unit holder 52 and the second magnification-varying lens unit holder 53 are connected into one unit which is integrally driven in the optical-axis direction by a driving mechanism section 55. The remaining configuration is the same as that of the second embodiment, and therefore the detailed description thereof is herein omitted.

Figure 12A:
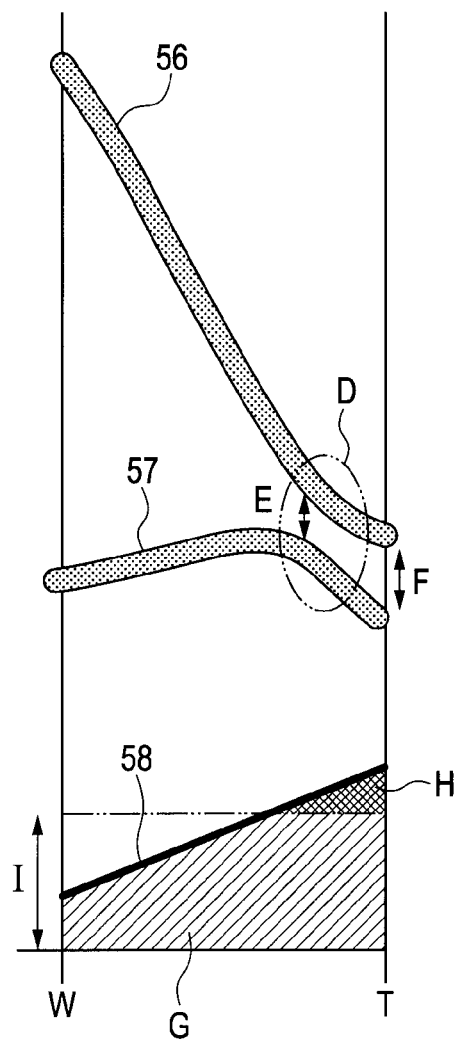
FIG. 12A is an explanatory view illustrating driving loci of lens units and a region in which an in-focus state can be achieved in the third embodiment.
Figure 12B:
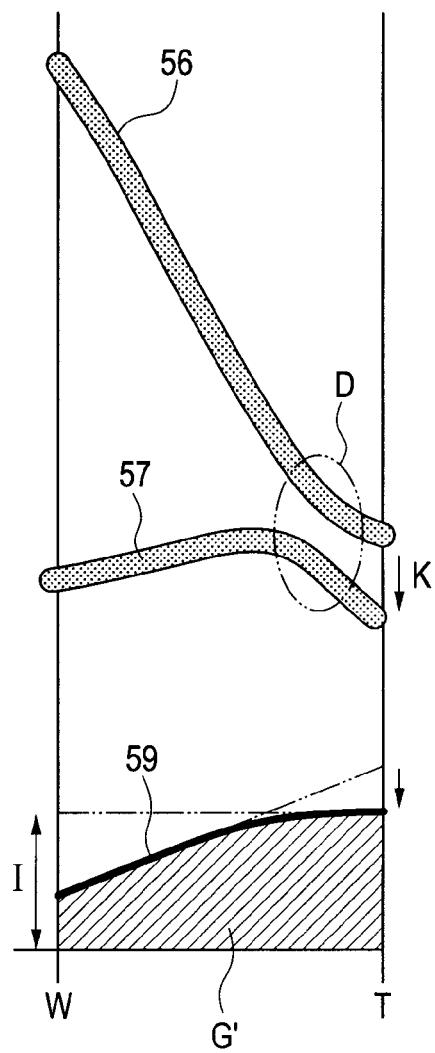
FIG. 12B is an explanatory view illustrating the driving loci of the lens units and the region in which the in-focus state can be achieved in the third embodiment (in the case where the distance between the magnification-varying lens unit and the aberration correction lens unit is changed on the telephoto side).
Figure 13:
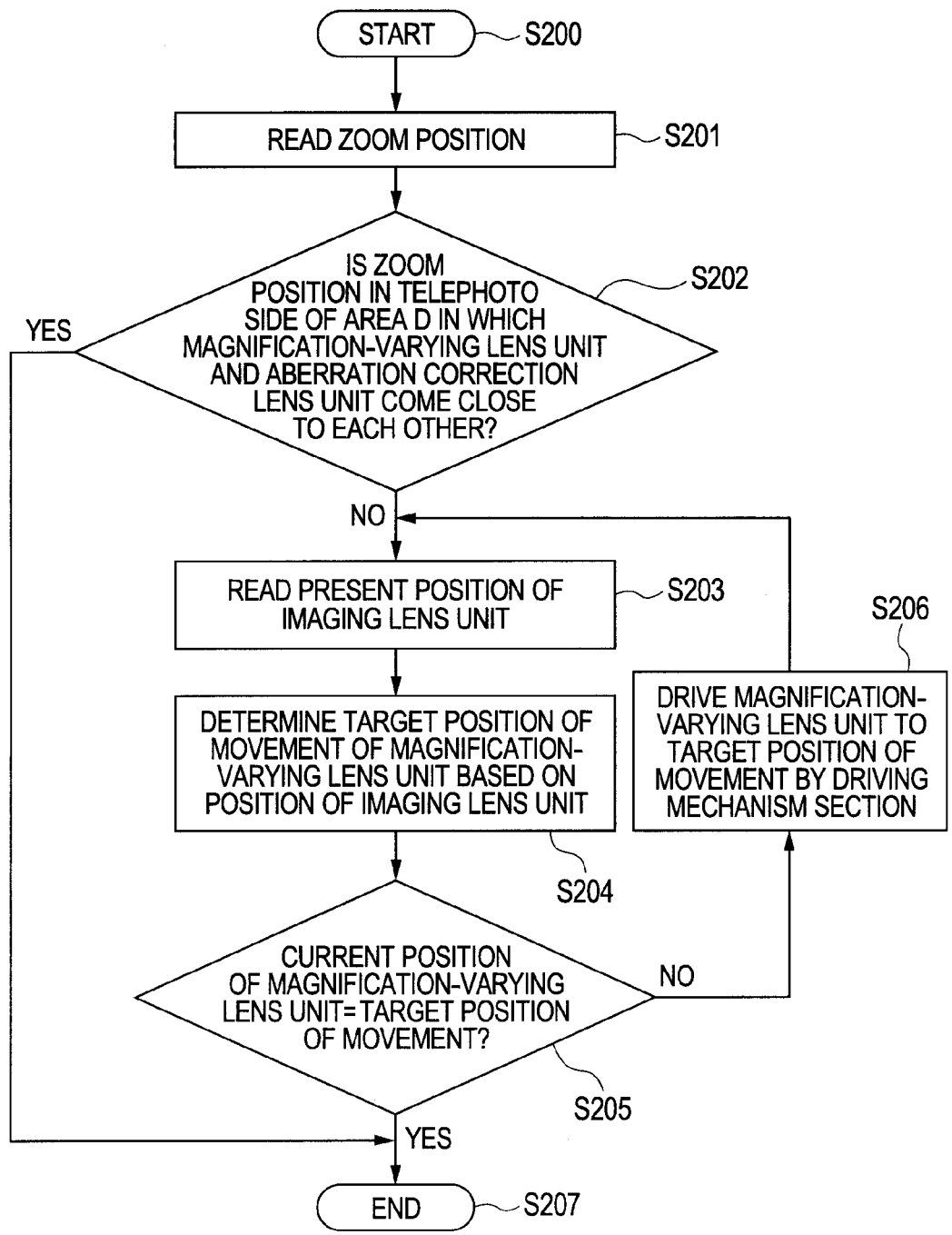
FIG. 13 is a flowchart illustrating a control flow in the third embodiment.

Next, a control method of integrally driving the magnification-varying lens unit 3 including the first magnification-varying lens unit 15 and the second magnification-varying lens unit 16 is described in detail referring to FIGS. 12A, 12B and 13.

FIG. 12A illustrates a driving locus 56 of the magnification-varying lens unit 3, a driving locus 57 of the aberration correction lens unit 4, and an area (movable range) G in which an in-focus stated can be obtained by the imaging lens unit 7 when close-up photography is performed, over the entire zoom range. A distance between the magnification-varying lens unit 3 and the aberration correction lens unit 4 becomes the shortest (distance E) in a region D in an intermediate zoom range and becomes larger (distance F) as moving toward the telephoto side, as indicated by the driving loci 56 and 57 illustrated in FIGS. 12A and 12B. Therefore, in the region D, the magnification-varying lens unit 3 and the aberration correction lens unit 4 are the closest to each other in terms of the structure without causing interference with each other. Therefore, as moving from the wide-angle side through the range D to the telephoto side, the distance becomes larger.

A line 58 illustrated in FIG. 12A indicates a distance of movement of the imaging lens unit 7 toward the subject side, which is required to achieve the in-focus state from an infinite side to a near side in the zoom range from the wide angle end to the telephoto end. A two-dot chain line for a distance I of movement of the imaging lens unit 7, illustrated in FIG. 12A, is a limit of mechanical movement of the imaging lens unit 7 toward the subject. The hatched range G illustrated in FIG. 12A is the range where the in-focus state can be achieved in each zoom range. When a range from the line 58 to the lower end of the graph is identical with the range G, the in-focus state can be achieved on the entire distance to the subject within the zoom range. Therefore, from FIG. 12A, the following can be understood. The in-focus state can be achieved on the wide angle end from the infinite side to the near side even if the range in which the imaging lens unit 7 is movable is not entirely used, whereas a region H where the in-focus state cannot be achieved on the near side (close-up photography side) is generated at the telephoto side even if the entire range in which the imaging lens unit 7 is movable is used.

To cope with the conditions described above, on the telephoto end side, only the magnification-varying lens unit 3 is driven to the imaging plane side by the driving mechanism section 55 so as to reduce the distance F between the magnification-varying lens unit 3 and the aberration correction lens unit 4 at the telephoto end of the operation. As a result, the range H where the in-focus state cannot be achieved can be reduced. FIG. 12B illustrates a locus 59 of the driven amount toward the image plane side for achieving the in-focus state of the imaging lens unit 7 at the time of close-up photography when the magnification-varying lens unit 3 is driven to the imaging plane side indicated by the arrow K at the telephoto end. On the telephoto side of the region D in which the distance between the magnification-varying lens unit 3 and the aberration correction lens unit 4 becomes the shortest, the magnification-varying lens unit 3 and the aberration correction lens unit 4 do not interfere with each other. Therefore, the magnification-varying lens unit 3 can be driven to the imaging plane side. As a result, the driven amount for achieving the in-focus state, which is required for the imaging lens unit 7 by the driving of the magnification-varying lens unit 3 to the imaging plane side, is reduced. Then, the region H where the in-focus state cannot be achieved, which is generated as illustrated in FIG. 12A, is reduced. As a result, the entire zoom range and the entire range of the distance to the subject can be obtained as a range G' where the in-focus state can be achieved, as illustrated in FIG. 12B.

The operating control of the magnification-varying lens unit 3 in the above-mentioned case is described referring to FIG. 13. A control flow illustrated in FIG. 13 is executed immediately after the zoom lens unit is driven to a desired zoom position by the rotation of the cam ring caused by the zoom operation. When the zoom operation is performed (the operation for operating the cam ring is performed), processing is forcibly restarted from Step S200 to start correction for enlarging the region in which the in-focus state can be achieved on the near side by the zoom lens. Then, the processing proceeds to Step S201 where the current zoom position is read.

In Step S202, it is determined whether or not the thus read current zoom position is located on the telephoto side of the zoom region D in which the magnification-varying lens unit 3 and the aberration correction lens unit 4 become the closest to each other. When the zoom position is located on the telephoto side, the processing proceeds to Step S203 so as to perform processing for driving the magnification-varying lens unit 3 by the driving mechanism section 55 with respect to the position of the imaging lens unit 7, for enlarging the region in which the in-focus state can be achieved on the near side, as illustrated in FIG. 12B.

When it is determined in Step S202 that the zoom position is not located on the telephoto side, the processing proceeds to Step S207 where the processing ends. In this case, the in-focus state can be achieved on the near side while the zoom position driven by the movement of the cam ring is at the position of the magnification-varying lens unit. Therefore, it is not necessary to operate the magnification-varying lens unit 3 alone by the driving mechanism section 55.

In Step S203, the current positional information of the imaging lens unit 7 is read. Subsequently, in Step S204, a target position of movement of the magnification-varying lens unit 3, which is required to achieve the in-focus state, with respect to the current position of the imaging lens unit 7, is calculated.

Next, in Step S205, whether or not the current position of the magnification-varying lens unit 3 is identical with the target position of movement is determined. When the current position is identical with the target position of movement or a difference therebetween is within a predetermined range, the processing proceeds to Step S207 where the processing ends. When it is determined in Step S205 that the current position is not identical with the target position of movement or the difference therebetween is larger than the predetermined range, the processing proceeds to Step S206 where the driving mechanism section 55 is driven to drive the magnification-varying lens unit 3 to the target position of movement. Then, the processing returns to Step S203.

The focus control is performed independently of the control flow for enlarging the region in which the in-focus state can be achieved at the time of close-up photography, illustrated in FIG. 13. During the magnification-varying operation (during the driving of the magnification-varying unit 3) by driving the cam ring, which is performed prior to the processing illustrated in FIG. 13 or during the control illustrated in FIG. 13, the focusing operation for maintaining the in-focus state with respect to a predetermined subject can be performed automatically or manually. Therefore, when the magnification-varying lent unit 3 is driven in Step S206, the position of the imaging lens unit is changed automatically or manually so as to achieve the in-focus state. Thus, there is a possibility that the target position of movement of the magnification-varying lens unit, which is determined in Step S204, sequentially changes. Specifically, in the processing illustrated in FIG. 13, the processing in Steps S203 to S206 is repeated to drive the magnification-varying lens unit 3 alone by the driving mechanism section 55 without driving the aberration correction lens unit 4. As a result, the in-focus range at the time of close-up photography is enlarged to achieve the in-focus state even on the near side.

The configuration in which the first magnification-varying lens unit and the second magnification-varying lens unit supported by the moving lens barrel 40 are driven in association by the driving mechanism section through the cam structure of the cam unit 10 by the respective amounts of operation is described in the first and second embodiments, whereas the configuration in which the first and second magnification-varying lens units are integrally driven is described in the third embodiment. However, the present invention is not limited to the above-mentioned configurations. The present invention is also applicable to a structure in which at least one lens unit of the plurality of lens units supported by the moving lens barrel is operated by the driving device, and the effects of the present invention can be enjoyed thereby.

Further, by an image pickup system including the lens apparatus of the present invention and an image pickup apparatus connected to the lens apparatus, the image pickup system having excellent optical performance provided by the lens apparatus of the present invention can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-293710, filed Dec. 28, 2010, which is hereby incorporated by reference herein in its entirety.

What is claimed is:

1. A lens apparatus comprising:
a fixed lens barrel having a straight groove and a contact;
a cam ring provided inside the fixed lens barrel, the cam ring having a cam groove;
a plurality of lens units; and
a first holding unit holding the plurality of lens units the first holding unit being supported movably in an the optical-axis direction inside the cam ring, and the first holding unit holding at least one of the plurality of lens units movably in the optical-axis direction in the first holding unit,
wherein the first holding unit comprises:
a driver that drives the at least one of the plurality of lens units in the optical-axis direction;
a plurality of cam followers, slidably engaged with the cam groove and the straight groove; and
a slide connecting portion electrically connecting to the contact in a slidable manner through the cam groove of the cam ring in a radial direction,
wherein the driver is fed with power from the fixed lens barrel side through the slide connecting portion.

2. A lens apparatus according to claim 1, wherein:
the slide connecting portion is configured integrally with one of the cam followers, and
the opening penetrating the cam ring in the radial direction is the cam groove of the cam ring.

3. A lens apparatus comprising:
a fixed lens barrel having a straight groove and a contact;
a cam ring provided inside the fixed lens barrel, the cam ring having cam grooves;
a focus lens unit;
a zoom lens unit comprising a plurality of magnification-varying lens units and an aberration correction lens unit;
a first holding unit holding the plurality of magnification-varying lens units, the first holding unit being supported movably in an optical-axis direction inside the cam ring, the first holding unit holding the plurality of magnification-varying lens units movably in an optical-axis direction in the first holding unit, and the first holding unit comprising a driver driving the plurality of magnification-varying lens units in the optical-axis direction; and
a second holding unit holding the aberration correction lens unit so as to be driven in the optical-axis direction, the second holding unit being supported movably in the optical-axis direction inside the cam ring,
wherein each of the first holding unit and the second holding unit comprises a plurality of cam followers slidably engaged with the cam grooves and the straight groove to determine a position of each of the first holding unit and the second holding unit in the optical-axis direction by rotation of the cam ring about an optical axis,
wherein the first holding unit comprises a slide connecting portion electrically connecting to the contact in a slidable manner through one of the cam grooves of the cam ring in a radial direction, and
wherein the driver is fed with power from the fixed lens barrel side through the slide connecting portion.

4. A lens apparatus according to claim 3, wherein:
the slide connecting portion is configured integrally with one of the cam followers, and
the opening penetrating the cam ring in the radial direction is one of the cam grooves.

5. A lens apparatus according to claim 3, further comprising:
a controller fixed to the fixed lens barrel, controlling driving of the driver for the first holding unit,
wherein the controller communicates a control signal with the driver through the slide connecting portion.

6. A lens apparatus according to claim 5, wherein:
the first holding unit comprises a detector detecting positions of the plurality of magnification-varying lens units, which are held by the first holding unit, in the optical-axis direction, and
the detector communicates a detection signal with the controller through the slide connecting portion.

7. A lens apparatus according to claim 5, wherein the controller controls the driver to operate the plurality of magnification-varying lens units to correct an angle-of-field variation generated by driving of the focus lens unit.

8. A lens apparatus according to claim 5, wherein the controller controls the driver to drive the plurality of magnification-varying lens units when the plurality of magnification-varying lens units are located on a telephoto side to enlarge a range of the lens apparatus, in which an in-focus state is achievable, to a near side.

9. An image pickup system comprising:
a lens apparatus; and
an image pickup apparatus connected to the lens apparatus, wherein the lens apparatus comprises:
a fixed lens barrel having a straight groove and a contact;
a cam ring provided inside the fixed lens barrel, the cam ring having a cam groove;
a plurality of lens units; and
a first holding unit holding the plurality of lens units, the first holding unit being supported movably in an optical-axis direction inside the cam ring, and the first holding unit holding at least one of the plurality of lens units movably in the optical-axis direction in the first holding unit,
wherein the first holding unit comprises:
a driver driving the at least one of the plurality of lens units in the optical-axis direction;
a plurality of cam followers, slidably engaged with the cam groove and the straight groove; and
a slide connecting portion electrically connecting to the contact in a slidable manner through the cam groove of the cam ring in a radial direction, and
wherein the driver is fed with power from the fixed lens barrel side through the slide connecting portion.

* * * * *